United States Patent
Mitchell et al.

(10) Patent No.: US 9,555,706 B1
(45) Date of Patent: Jan. 31, 2017

(54) TRACTION CONTROL SYSTEM AND PROCESS FOR A MACHINE HAVING A WORK IMPLEMENT (71) Applicant: Caterpillar Inc., Peoria, IL (US)

(72) Inventors: Michael Mitchell, Aurora, IL (US); Norval Thomson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/939,962

(22) Filed: Nov. 12, 2015

(51) Int. Cl.
B60W 30/184 (2012.01)
B60K 28/16 (2006.01)
E02F 9/20 (2006.01)
E02F 9/26 (2006.01)
E02F 3/34 (2006.01)

(52) U.S. Cl.
CPC .......... B60K 28/165 (2013.01); E02F 9/2079 (2013.01); E02F 9/264 (2013.01); B60W 2300/17 (2013.01); B60W 2520/105 (2013.01); B60W 2520/26 (2013.01); B60W 2720/30 (2013.01); B60Y 2200/415 (2013.01); B60Y 2300/18175 (2013.01); B60Y 2300/42 (2013.01); E02F 3/34 (2013.01)

(58) Field of Classification Search
CPC ...................... B60W 2300/17; B60W 2520/26; B60W 2520/105; B60W 2720/30; B60K 28/165; E02F 9/2079; E02F 9/264; E02F 3/34; B60Y 2200/415; B60Y 2300/18175; B60Y 2300/42
See application file for complete search history.

(56) References Cited

U.S. PATENT DOCUMENTS

| | | | |
|---|---|---|---|
| 6,182,002 B1 | 1/2001 | Bauerle et al. | |
| 6,295,500 B1 | 9/2001 | Cullen et al. | |
| 6,405,844 B1 | 6/2002 | Takamatsu | |
| 6,473,683 B1 * | 10/2002 | Nada | B60K 6/445 180/197 |
| 7,050,899 B2 * | 5/2006 | Masters | F02P 9/005 180/197 |
| 7,779,947 B2 | 8/2010 | Stratton | |
| 8,706,378 B2 | 4/2014 | Choby | |
| 2012/0226399 A1 | 9/2012 | Bergfjord | |
| 2012/0293316 A1 | 11/2012 | Johnson et al. | |
| 2014/0005898 A1 | 1/2014 | Byers et al. | |

* cited by examiner

Primary Examiner — Richard Camby
(74) Attorney, Agent, or Firm — Baker & Hostetler LLP (57) ABSTRACT A traction control system configured to limit slip by a machine having a work implement including a machine motion sensor configured to determine a motion of the machine, a work implement unit configured to determine whether the work implement is in an operational state, a powertrain motion sensor configured to determine a motion of a powertrain component, and a machine powertrain controller configured to determine slip by comparing the motion of the machine to the motion of the powertrain component, wherein the machine powertrain controller is configured to command a torque reduction to the powertrain component when slip is determined.

20 Claims, 4 Drawing Sheets

TRACTION CONTROL SYSTEM AND PROCESS FOR A MACHINE HAVING A WORK IMPLEMENT

TECHNICAL FIELD

The disclosure is related to a traction control system and process for use in a machine, and more particularly a traction control system and process for a machine having a work implement.

BACKGROUND

Machines including large wheel loaders, wheel dozers, or tracked bulldozers may be used for engaging with high impact loads at a construction or mining worksite. Such use may be generally referred to as pile engagement. These machines benefit from high torque and engine speed when engaging with the pile of material. Often these machines are being operated on uneven or unpaved terrain, for example, for transporting a rock pile in a rock-filled mine. One problem that may become cost prohibitive during the lifetime of the machine is tire or track failure. For example, in a mining application, where a rock or other material pierces the tire while there is still a significant amount of tread left. The tire on a wheel may need replacement before a full life cycle of the tire tread wearing thin. This cost of tire or track replacement for a wheel loader, wheel dozer, or tracked bulldozer may represent a large portion of the cost to operate the machine.

In this regard, a problem in the industry is that an operator of the machine is unable to ascertain in enough time to prevent such catastrophic tire failure because there is no sure indicator of a tire slippage until the damage has been realized. This is because even a quarter of a rotation of a tire may result in a deep tear. Such a deep tear lends itself to failure of the tire entirely. Alternatively, all four tires may fail when the tires are spinning together, and therefore slight operator delayed reaction time to reduce the torque delivered to the tires is often too late.

A few devices or techniques for traction control for such machines have been developed that fail to address the above noted problems. Traditional traction control design may attempt to eliminate tire slip in all scenarios. However this can be cost prohibitive as it requires multiple wheel speed sensors, knowledge of the machine's articulation angle, individual wheel speeds as well as a means to eliminate slip for each wheel.

U.S. Pat. No. 6,182,002, entitled "Vehicle acceleration based traction control," discusses a fraction control system in which a tire spin condition is detected based on measured machine acceleration instead of measured wheel speeds. An electronic controller detects a tire spin condition by computing the acceleration of the vehicle drive shaft and comparing the computed acceleration to an acceleration threshold.

However, prior art approaches, such as the system in the '002 patent, may be expensive to implement, are not configured to determine a state of the machine components for slip determination, such as pile engagement, and/or are not configured to determine state of the machine powertrain for slip determination.

SUMMARY OF THE DISCLOSURE

In one aspect, the disclosure describes a traction control system configured to limit slip of a machine having a work implement, the traction control system including a machine motion sensor configured to determine a motion of the machine, a work implement unit configured to determine whether the work implement of the machine is in an operational state, a powertrain motion sensor configured to determine a motion of a powertrain component, and a machine powertrain controller configured to: compare the motion of the machine determined by the machine motion sensor to the motion of the powertrain component determined by the powertrain motion sensor to determine slip, command a torque reduction to the powertrain component when slip is determined, enable torque reduction when it is determined by the work implement unit that the work implement of the machine is operational, and be disabled for torque reduction when it is determined by the work implement unit that the work implement of the machine is not operational.

In one aspect, the disclosure describes a machine including a machine frame, an engine held by the machine frame, a machine motion sensor configured to determine a motion of the machine, a work implement unit configured to determine whether the work implement of the machine is in an operational state, a powertrain motion sensor configured to determine a motion of a powertrain component, a machine powertrain controller configured to compare the motion of the machine determined by the machine motion sensor to the motion of the powertrain component determined by the powertrain motion sensor to determine slip, the machine powertrain controller being further configured to command a torque reduction to the powertrain component when slip is determined, the machine powertrain controller being further configured to enable torque reduction when it is determined by the work implement unit that the work implement of the machine is operational, and the machine powertrain controller being further configured such that torque reduction is disabled when it is determined by the work implement unit that the work implement of the machine is not operational.

In one aspect, the disclosure describes a traction control process configured to limit slip of a machine having a work implement, including determining a motion of the machine with a machine motion sensor, determining whether the work implement of the machine is in an operational state with a work implement unit, determining a motion of a powertrain component with a powertrain motion sensor, comparing the motion of the machine determined by the machine motion sensor to the motion of the powertrain component determined by the powertrain motion sensor to determine slip with a machine powertrain controller, reducing a torque to the powertrain component when slip is determined by the machine powertrain controller, enabling the machine powertrain controller to reduce the torque when it is determined by the work implement unit that the work implement of the machine is operational, and disabling the machine powertrain controller from reducing the torque when it is determined by the work implement unit that the work implement of the machine is not operational.

DETAILED DESCRIPTION

The present disclosure relates to a system and method for a traction control system and process that detects various inputs and responds by reducing torque in the powertrain system. In particular, one input may be indicative of an acceleration and/or speed of the powertrain determined by a sensor. Another input may be indicative of the acceleration and/or speed of the machine determined by an accelerometer. When the machine is operating without slipping, acceleration of the powertrain will have a linear relationship with the acceleration of the machine. During such operations, the traction control system would take no action. On the other hand when the machine is operating with slipping, acceleration of the powertrain will be greater, based on the linear relationship, than the acceleration of the machine. During such events, the traction control system will act to reduce slipping. Additionally, the traction control system may only be active when the machine is actively operating a machine implement.

Figure 1:
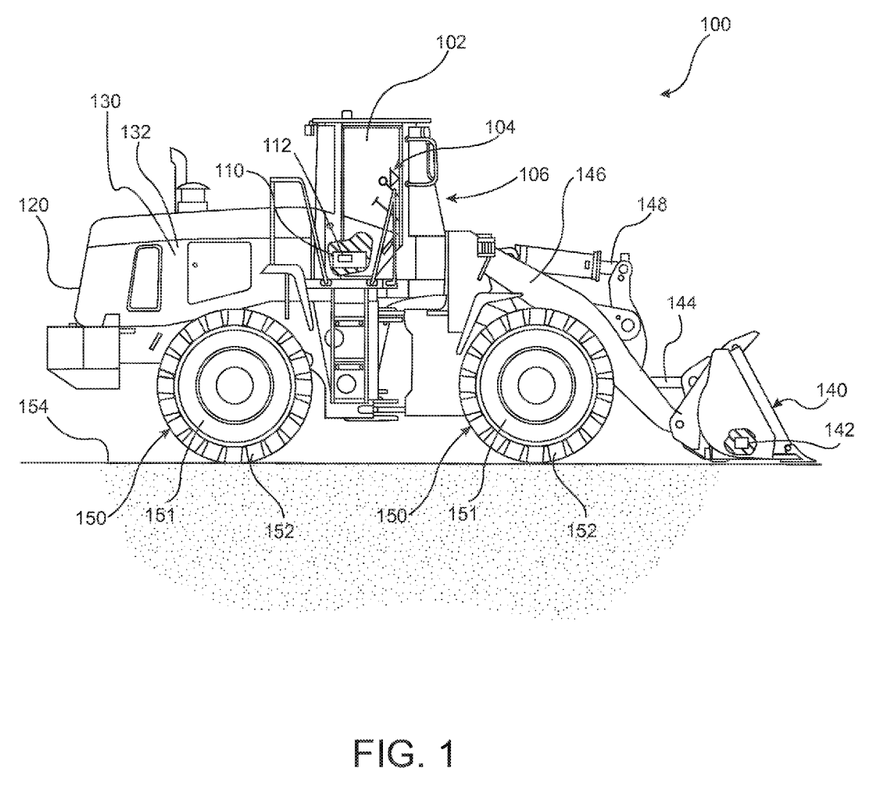
FIG. 1 illustrates a side view of a machine that includes a traction-control system in accordance with aspects of the present disclosure.

Now referring to the drawings, wherein like reference numbers refer to like elements, FIG. 1 illustrates a side view of the machine 100 in accordance with aspects of the present disclosure. In an exemplary aspect, the machine 100 may embody a wheel loader, off-highway truck, tracked bulldozer or similar ground-engaging machine 100 such as those used for construction, mining, or quarrying. The machine 100 may include a machine frame 120 holding and encompassing, in part, non-moving structural aspects of the machine 100. An operator station or operator cab 102 attaches to the machine frame 120 and may house various controls and devices necessary to operate the machine 100. Operator input devices 104 may include, steering devices, joysticks, foot pedals, or the like disposed within the operator cab 102 and configured to receive an input from an operator indicative of an operator desired movement of any component of the machine 100. An operator input system unit 106 may be attached to the operator input devices 104.

The operator input system unit 106 may be configured to provide an interface to the operator input devices 104. In one aspect, the operator input system unit 106 may be configured to: provide power to the operator input devices 104, provide signal conditioning for signals and store signals from the operator input devices 104, provide communication capabilities to and from the operator input devices 104, convert analog signals to digital signals, and/or assist in diagnostics for the operator input devices 104. Further, the operator input system unit 106 may communicate with a machine controller (illustrated in FIG. 2).

In FIG. 1, a machine accelerometer 110 may be connected with a machine accelerometer unit 112 that may be located either in the operator cab 102 or another location on the machine frame 120 to generate an output such as an acceleration and/or linear speed of the machine 100. The machine accelerometer unit 112 may be configured to provide an interface to the machine accelerometer 110. In one aspect, the machine accelerometer unit 112 may be configured to: provide power to the machine accelerometer 110, provide signal conditioning for signals and store signals from the machine accelerometer 110, provide communication capabilities to and from the machine accelerometer 110, convert analog signals to digital signals, and/or assist in diagnostics for the machine accelerometer 110.

The machine 100 of the illustrated aspect may include a work implement 140 that may be pivotally connected to the machine frame 120 by a pivotal connection point to one end of a linkage arm 146. The linkage arm 146 may be controlled by the operator input devices 104 and/or the operator input system unit 106 and may articulate through a system of mechanical or hydraulic cylinders 144. In another aspect, the linkage arm 146 may be controlled autonomously or remotely. A movement of the work implement 140 is likewise controlled by a hydraulic cylinder 144 that may be connected to the linkage arm 146 and controlled by the operator input system unit 106 or other controller system. The work implement 140 illustrated in the aspect of FIG. 1 is a bucket for use in picking up and transporting material. Alternatively, the work implement 140 can take any other form, for example, a digging tool or blade.

A work implement unit 142 may be located on the work implement 140 to monitor the work engagement state of the work implement 140. Alternatively, the work implement unit 142 may be housed elsewhere on the machine 100 like on a hydraulic system on the machine frame 120. The work implement unit 142 may be configured to monitor the work implement 140. In one aspect, the work implement unit 142 may monitor various inputs and parameters of the work implement 140, for example, engagement with a pile of material, being in a resting position, and/or digging into the ground. The work implement 140 and work implement unit 142 may communicate by a system of sensors embedded on the machine 100. The work implement unit 142 may determine whether the machine 100 is engaged with a pile. Engaged with a pile may be any activity by the machine 100 where the work implement 140 is operating to carry out such activities as dig, carry a load, and the like. In another aspect, the work implement unit 142 may be configured to: provide power to a sensor associated with the work implement 140, provide signal conditioning for signals and store signals from the sensor associated with the work implement 140, provide communication capabilities to and from the sensor associated with the work implement 140, convert analog signals to digital signals, and/or assist in diagnostics for the work implement 140.

The machine frame 120 may be connected to a machine powertrain system 130 that provides power to the machine 100. The machine powertrain system 130 may include an engine 132 such as, for example, a diesel engine, a gasoline engine, a gaseous fuel-powered engine, any other type of combustion engine well known in the art, or the like. It is contemplated that the machine powertrain system 130 may alternatively embody an electric motor. The machine 100 may further include a non-combustion source of power (not shown) such as, for example, a fuel cell, a power storage device, or another suitable source of power.

The rotational power of the machine powertrain system 130 and engine 132 may be effectively transmitted through a drivetrain (see FIG. 2) to the ground engaging member(s) 150 configured to support and propel the machine 100. The ground engaging members 150 may be wheels 151 that may be further provided with tires 152. Although wheels are shown in the aspect of FIG. 1, other types of ground engaging members 150 may be used on these machines 100, for example, tracks. The operator input devices 104 may be configured to receive various inputs for controlling the movement of the machine 100. The operator input system unit 106 may likewise selectively retard or decelerate movement or adjust a torque provided to the ground engaging members 150 in a variety of manners, and thus selectively retard or decelerate movement of the machine 100. Alternatively, the operator input system unit 106 may in addition to, or instead of, utilize an electrohydraulic control solenoid to operate a braking system (not pictured).

It should be noted that the machine 100 may benefit from high values of torque and engine speed when engaging with a pile of material, and when needed, a manually operated or automatic control system is contemplated that dictates delivery of increased or decreased engine speed or torque, for instance a right or left operator pedal respectively. Alternatively, an electronic control system can bypass the need for operator input to the pedals. While operating a work implement 140, for instance when digging in a pile, less power may be desired. In that aspect, a clutch or similar type device may be configured to adjust the torque provided to the ground engaging members 150 without affecting how much power is being transmitted to the machine 100 hydraulic or electric system.

Figure 2:
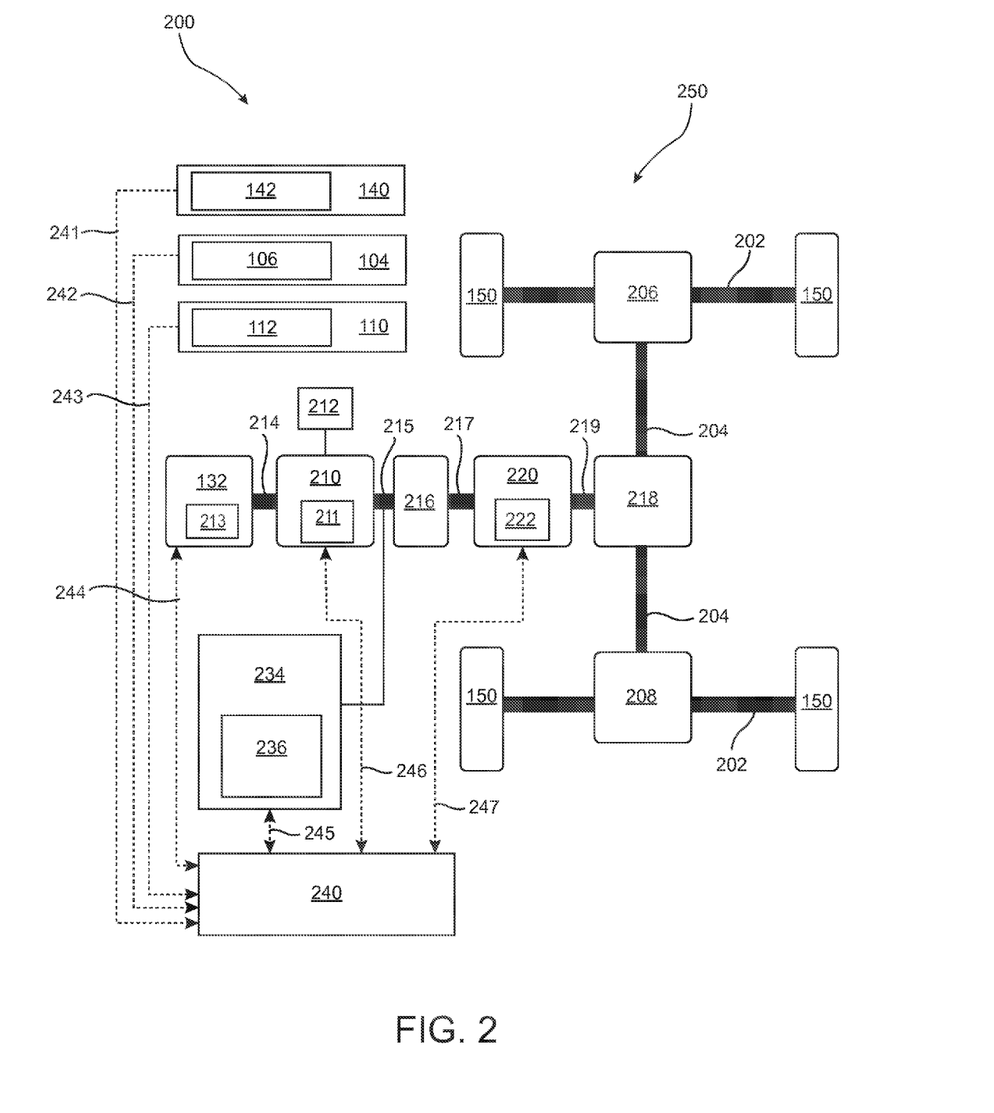
FIG. 2 illustrates a schematic of a powertrain and drivetrain for the machine of FIG. 1 in accordance with aspects of the present disclosure.

FIG. 2 illustrates a schematic of an aspect of a traction control system 200 of the machine 100 that controls the machine powertrain system 130 and/or a drivetrain 250 under a control of a machine powertrain controller 240. In accordance with an illustrative aspect, the machine powertrain system 130 (discussed below) may control the amount of power and/or torque transmitted by the drivetrain 250. This power and/or torque transmission may be accomplished via the axles 202 that transmit power to the ground engaging members 150 via the front and rear differentials 206 and 208 from rotational power provided by the output of the engine 132. Although two driven axles 202 are shown, a single axle 202 or more than two axles 202 may be used depending on the type of machine 100. Although wheels 151 are shown in the aspect of FIG. 2, other types of ground engaging members 150 may be used on these machines 100, for example, tracks.

In accordance with an illustrative aspect, the engine 132 may connect to an engine speed sensor unit 213 that may be configured to provide an interface to the engine 132. In one aspect, the engine speed sensor unit 213 may be configured to provide signal conditioning for engine speed signals, provide communication capabilities for engine speed signals, and generally assist in diagnostics for the engine speed sensor unit 213. The engine 132 may connect to a torque converter 210 via an output shaft 214. The torque converter 210 may include a sensor unit 211 that may be configured to provide an interface to the torque converter 210. The torque converter may include an impeller driven by a power source (e.g. the engine 132), a turbine operatively coupled to the transmission 220 and a stator positioned between the impeller and turbine to redirect fluid flowing from the turbine to the impeller. The torque converter 210 may be capable of multiplying torque under conditions where the input rotational speed is significantly different from the output rotational speed.

In one aspect, the torque converter 210 may include a slip clutch 212, for example an impeller clutch, modulated to reduce powertrain torque and eliminate tire slip. Torque may be uniformly reduced across the machine powertrain system 130 using modulation and delivery methods of the machine powertrain system 130 such as through complete and/or partial disengagement of one or more slip clutches 212 such as the impeller clutch, transmission clutch, differential clutch, and/or any clutched portion of the machine powertrain system 130 as well as parallel or serial path hybrid mechanisms (electric or hydraulic). In one aspect, the impeller clutch of a torque converter 210 may be configured or controlled. The configuration or control of the impeller clutch may include determining a function relating a K-factor of the torque, determining a current engine torque, determining a desired impeller clutch slip, using the function to determine the actual impeller speed and thus actual clutch slip, and adjusting the operating state of the impeller clutch to produce the desired impeller clutch slip.

In another aspect, reducing torque across the machine powertrain system 130 may include gear changes to a higher gear in slip conditions. For example, upshifting to a higher gear in the transmission 220 to reduce torque. During a ratio change phase of the upshift, the net torque transmitted to the powertrain transmission 220 can be controlled. At higher gears, there exists less torque after each upshift, thus acting as a reduction in torque when in a slip condition.

The torque converter 210 may in turn be connected to a transmission 220 via a connecting shaft 215 and utilize an input transmit gearbox 216 likewise connected to the transmission 220 via a shaft 217. The transmission 220 may be coupled to a transmission controller unit 222 that may be configured to provide an interface to the transmission 220. The transmission controller unit 222 may be equipped with a transmission output speed sensor (not pictured) and other such devices that can selectively engage and disengage various gear sets of the transmission 220 in response to commands from the controller 240. Further the transmission controller unit 222 may be equipped to receive, temporarily store, and output parameters indicative of the current gear engagement state of the transmission 220. Such input and output parameters of the transmission controller unit 222 may include but not be limited to: the power transmitted to the ground engaging members 150, the speed of the output shaft 214, the speed of the connecting shaft 215, and the like. During operation, the transmission controller unit 222 may be equipped to command gear changes to the transmission 220 based on, for example, predetermined thresholds of a tire slip event. In another aspect, the transmission 220 may be a continuously variable control transmission, or alternatively a transmission powertrain such as a hydraulic parallel-path-to-variable, or any other type of powertrain. The transmission 220 then may transmit power to the ground engaging members 150 via an output shaft 219 that may be connected to a splitter drive referred to as a drop box 218 that may power one or more of the drive shafts 204, one for each axle 202.

In accordance with another example, it should be appreciated that the slip clutch 212 may be located on any component between the engine 132 and the ground engaging members 150. In one aspect, the slip clutch 212 may be housed in the torque converter 210. For example, the slip clutch 212 may be implemented as an impeller clutch in the impeller of the torque converter 210. In another aspect, the slip clutch 212 may be connected to the transmission 220. In another aspect, the slip clutch 212 may be connected to the drop box 218. Alternatively, torque and/or power control can be implemented with an electric drivetrain and not to a particular type of powertrain.

A powertrain accelerometer 234 may be coupled to a powertrain accelerometer unit 236 that together in combination or in part senses, measures and/or monitors motion parameters such as the acceleration and/or speed of the machine powertrain system 130. The powertrain accelerometer 234 may be mounted on a non-rotating structure such as adjacent the connecting shaft 215, the transmission 220, and so forth, to afford the appropriate sensitivity to the revolutions of the machine powertrain system 130 and accordingly the rotation or the ground engaging members 150. In one aspect, for example, the powertrain accelerometer 234 may be located in the torque converter 210. The powertrain accelerometer 234 need only contain a single sensor to measure some rotation or acceleration of the machine powertrain system 130, but can contain more than one, that can measure motion of the machine powertrain system 130 or drivetrain 250. For example the rotational speed of the drive shaft 204 or actual acceleration of the machine powertrain system 130 may be measured and assessed by the controller 240 with the machine accelerometer 110 real-time output. In accordance with another aspect, the powertrain accelerometer 234 can also receive inputs of some aspect of the machine powertrain system 130 rotation and speed as well as acceleration.

As shown in the illustrated aspect, the subsystems of the traction control system 200 may be in communication with a powertrain electric control module (ECM) or also referred to herein as the controller 240. The controller 240 may operate to monitor and control the function of the various engine systems, such as monitor sensor readings, commanding the engine 132 and the speed of the transmission 220, load and work implement output, and so forth. This monitoring and controlling of the controller 240 is done by receiving information, converting and analyzing it, and transmitting commands to various powertrain components such as engine and transmission components through at least one communication channel. The controller 240 may include a processor operably associated with other electronic components such as a data storage device and communication channels that can receive, translate, store and output parameters.

As illustrated in one aspect, the controller 240 may be further configured to receive information indicative of the operational state of the remaining pertinent subsystems of the machine powertrain system 130 such as, but not limited to, the engine 132, the torque converter 210, and the transmission 220. In this way, the controller 240 may be connected to the engine speed sensor unit 213 via an engine speed communication channel 244, the torque converter locked state indicated by the sensor unit 211 via a torque converter communication channel 246, the transmission controller unit 222 via a transmission communication channel 247, and to the powertrain accelerometer 234 via a accelerometer control unit communication channel 245.

Expanding upon the illustrated example, the transmission 220 may include structures that can selectively engage and disengage various gear sets such as the input transmit gearbox 216, the drop box 218, and/or the like in response to commands from the transmission controller unit 222. Further these structures may be configured to provide information to the transmission controller unit 222 indicative of the current gear engagement state as well as other information, such as the power transmitted to the ground engaging members 150 through the transmission 220, the speed of the output shaft 219, the speed of the connecting shaft 215, and the like. During operation, the transmission controller unit 222 may command gear changes to the transmission 220 based on predetermined connecting shaft 215,217 speed thresholds for upshift and downshift changes.

In another aspect, information may be exchanged between the controller 240 and the transmission controller unit 222 via a data bus. It should be appreciated that although the controller 240 and the transmission controller unit 222 are shown as separate components they may alternatively be integrated into a single control unit or separated into more than two control units. For example, a master controller, used to control the overall operational state and function of the machine 100, may be cooperatively implemented with a motor or engine controller unit, used to control the engine 132. In this aspect, the term "controller" is meant to include one, two, or more controllers that may be associated with the machine 100 and that may cooperate in controlling various functions and operations of the machine 100 (FIG. 1). The functionality of these devices, while shown conceptually in the figures to include various discrete functions for illustrative purposes only, may be implemented in hardware and/or software without regard to the discrete functionality shown. Accordingly, although various interfaces of the controller 240 are described relative to powertrain components of the machine powertrain system 130 in the figures, such interfaces are not intended to limit the type and number of components that are connected, nor the number of controllers that are described.

The controller 240 may be further configured to receive and transmit information indicative of the operation of the remaining portions of the machine 100 such as the work implement 140, the operator input devices 104, and the machine accelerometer 110. In this way, the work implement unit 142 that is monitoring the state through sensors of the work implement 140 may be in communication with the controller 240 via a work implement engagement communication channel 241. For example, the work implement unit 142 may be configured to receive inputs such as: operator commands and commanding from the operator input system unit 106, work implement 140 angle, work implement weight, engagement with a load of material, the operational state of the linkage arm 146 hydraulic system or a hydraulic cylinder 148, and the like. The operator input system unit 106 may be in communication with the controller 240 via a communication channel 242. In another example, the operator input devices 104 such as a pedal sensor may be configured to provide signals and communication to the operator input system unit 106 and then to the controller 240 indicative of the desired ground speed of the machine 100.

Continuing to reference FIG. 2, the machine accelerometer unit 112 acts to monitor the machine 100 acceleration and/or speed and may communicate motion of the machine 100 to the controller 240 via a machine acceleration communication channel 243. The machine accelerometer 110 may generate an acceleration signal with information on the acceleration, and the controller 240 is configured to receive the signal. In another aspect, the machine accelerometer unit 112 can sense machine linear speed and translate that into an acceleration based on a change in speed.

In another aspect, the machine powertrain system 130 and/or drivetrain 250 may include a hydraulic or electric hybrid implementation. For a hydraulic implementation, hydraulic components such as a hydraulic pump, hydraulic motor, and the like may be located on the machine frame 100, for example on the axle 202 and/or the drive shaft 204. The traction control system 200 may be configured to measure the acceleration of one or more of the hydraulic components and/or ground engaging members 150, for example the wheels 151, the tires 152, or the tracks (not pictured). In another aspect, the machine 100 may include an electric hybrid implementation with hybrid electric components. The hybrid electric components may include a generator, at least one motor, and the like. The traction control system 200 may be configured to measure the acceleration of one or more of the hybrid electric components and/or ground engaging members 150, for example the wheels 151, the tires 152, or the tracks (not pictured).

All the units communicating with the controller 240 and the machine 100 subsystems may be capable of generating and receiving sensor inputs, convert signals and filter other inputs. The units may, for example filter inputs, provide power signals, convert analog to digital signals and vice versa, and many other functions. It should be appreciated that additional or alternative connections between the controller 240 and the various engine and/or machine subsystems may be present but are not shown for simplicity.

Figure 3:
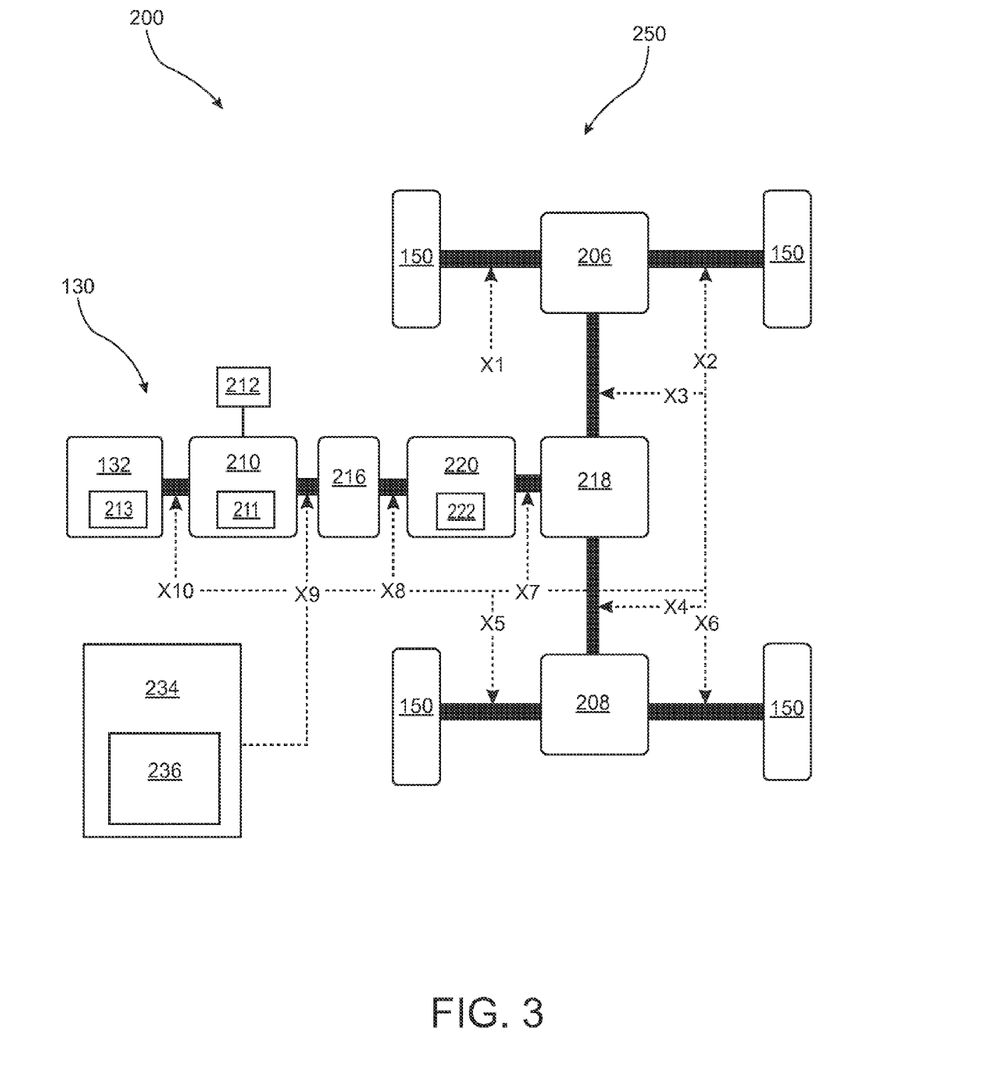
FIG. 3 illustrates a schematic of a powertrain and drivetrain for the machine of FIG. 1 in accordance with aspects of the present disclosure.

FIG. 3 illustrates another aspect of the traction control system 200 of FIG. 2. With reference to FIG. 3, a powertrain accelerometer 234 and the associated powertrain accelerometer unit 236 may be located at one or more multiple locations on the drivetrain 250 or the machine frame 120. The powertrain accelerometer 234 acts to access and monitor the motion, such as acceleration and/or speed, of the machine powertrain system 130 and may be mounted on a non-rotating structure to afford the appropriate sensitivity to the revolutions the ground engaging members 150, such as the tires 152, and/or track (not pictured). Such mount locations are here indicated by X1, X2, X3, . . . X10. It is contemplated that the powertrain accelerometer 234 may be mounted at a location between a power source, for example an engine 132 or transmission 220, and the ground engaging members 150, for example the wheels 151 or track (not pictured). In one aspect, the powertrain accelerometer 234 may be located on the torque converter 210. In another aspect, the powertrain accelerometer 234 may be located on the drive shafts 204.

INDUSTRIAL APPLICABILITY

The traction control system may be provided as part of the original equipment of a machine or the like in the construction and/or mining industry, or as an add-on to be easily retrofit to provide complementary structure for engagement with the machine 100. The system may be utilized on many types of machines 100, including off-highway and over-the-road machines that may perform some type of operation associated with an industry such as mining, construction, farming, transportation, or any other industry known in the art. Moreover, any type of machine 100 may benefit from the traction control systems consistent with the disclosure.

The traction control system 200 may use a software trigger that detects when the work implement 140 is digging or otherwise engaged with a pile of material. A single powertrain accelerometer 234 may be integrated into the existing hardware of the machine 100. When the work implement 140 is engaging, the controller 240 can monitor the status of such parameters like the speed or acceleration of the machine frame 120 versus wheel or track speed and acceleration of the machine powertrain system 130. The powertrain accelerometer 234 provides independent knowledge of whether the machine 100 is accelerating. Thus the machine powertrain controller 240 reacts faster to a slip condition than a human operator can react to a slip condition and may then be configured to command a necessary immediate torque reduction in the machine powertrain system 130 to constrain slip of the ground engaging members 150. If the machine powertrain system 130 acceleration no longer exceeds the machine accelerometer 110 acceleration value, the fraction control process 400 knows the tires 152 are no longer slipping and can reintroduce torque accordingly.

Figure 4:
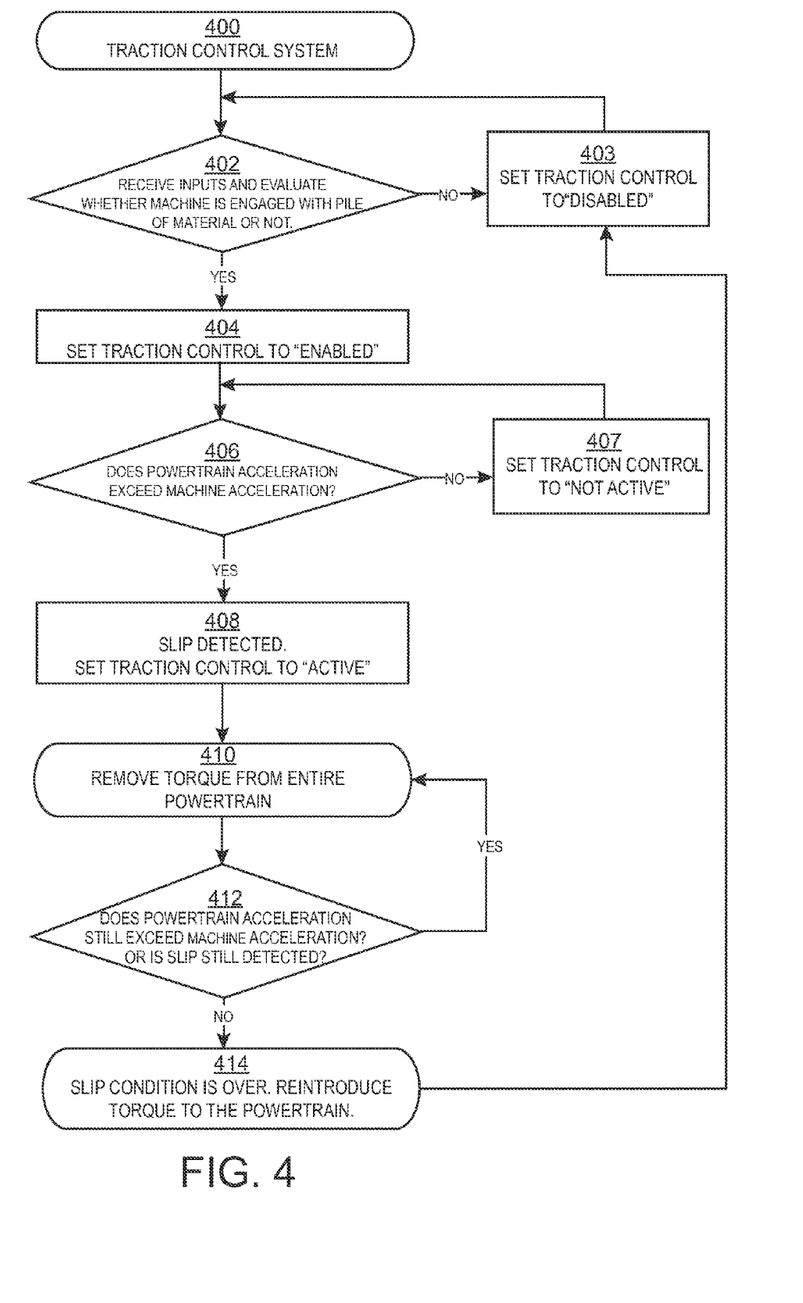
FIG. 4 illustrates a block diagram for a traction control process of a traction control system in accordance with aspects of the present disclosure.

FIG. 4 illustrates an exemplary block diagram for a traction control process 400 that may be implemented by the fraction control system 200 in accordance with aspects of the present disclosure, also referencing and incorporating the previous illustrations in FIGS. 1-3. It is contemplated that the controller 240 may be monitoring a state of the machine 100 subsystems.

At block 402, the controller 240 may access or receive various input signals from the work implement unit 142 as well as the operator input system unit 106 detecting whether or not the work implement 140 is operational, such as being engaged with a pile of material. When the work implement 140 is operational, the controller 240 can thus enable Traction Control. Such inputs for pile engagement detection may occur in multiple differing ways and meet predetermined work implement engagement thresholds stored in the controller 240. Examples of the types of inputs that may indicate pile engagement to the controller 240 may be when the machine speed is low, for example under a threshold of 2 mph, or when the engine load is high, around 70% of engine capacity, meaning that the engine 132 is using a large amount of power to move material. Another such input indicating pile engagement may detect that the operator has commanded the operator input devices 104 such that the work implement 140 is engaging in work. Another such input indicating pile engagement may represent that the angle of the linkage arm 146 and/or angle of the bucket is in a predetermined digging position range indicative that the work implement 140 is level with and in near contact with the ground. Another input that may indicate pile engagement to the controller 240 is a sensor monitoring pressure in the hydraulic cylinder 144 or the hydraulic cylinder 148 for tilt or lift in association with a load or a pile. These and other types of pile engagement detection are contemplated in the disclosed traction control process 400.

Referring to the outputs of the controller 240 as represented by blocks 403 and 404, the controller 240 may send feedback that the work implement 140 is either in an ENGAGED state ("YES") or not ENGAGED ("NO"). If the work implement is not ENGAGED with, for example, a pile of material, block 403 is then executed to set Traction Control to "DISABLED." The controller 240 may continue to block 402 to monitor the work implement 140 4 pile engagement and then a change in status. But if the work implement is ENGAGED with a pile of material, block 404 is executed to set Traction Control to "ENABLED" thus traction control is effectively turned to an ON state.

Even as the traction control system is ENABLED, it is contemplated that the process is continually looping through the status check of whether a pile is ENGAGED or not. If the work implement is NOT engaged at any point, then block 402 illustrates that the controller 240 may direct traction control to block 403 to set traction control to the state of DISABLED.

In the aspect described herein, in block 406, the machine powertrain controller 240 may perform an analysis of inputs from the machine accelerometer unit 112 detecting machine acceleration, assigning a value to the machine acceleration received input, and then comparing the value to the powertrain acceleration value the controller 240 is also receiving from the powertrain accelerometer unit 236. At the point the powertrain transmission acceleration value exceeds the machine accelerometer 110 acceleration, then the system has detected a slip condition. In one aspect, the acceleration comparison may further be based on a pre-set threshold of what constitutes a slip condition.

In another aspect, it is also contemplated that the machine 100 speed can likewise be monitored and compared to the powertrain speed. For example, a powertrain accelerometer 234 on the drive shaft 204 can determine actual machine wheel speed or sense wheel speed by summing or integrating the acceleration signal over time. Alternatively, a speed sensor may be implemented on the drive shaft 204 to directly determine drive shaft speed, powertrain speed and/or wheel speed. The system may then compare the drive shaft speed, powertrain speed and/or wheel speed to the machine speed. In another aspect, the controller 240 may be programmed to convert the real-time acceleration value into a speed value, or vice versa.

At block 406, the machine powertrain controller 240 may be monitoring and comparing the current states of the machine powertrain system 130 and the machine frame 120, in addition or alternatively to comparing values to predetermined thresholds stored in an electronic processor. When the machine 100 is digging and the work implement 140 is engaged, the system may evaluate a proportional value of the drive shaft speed, powertrain speed and/or the speed of the ground engaging members 150 and compare this speed with a speed of the machine frame 120. At the point the drive shaft speed, powertrain speed and/or the speed of the ground engaging members 150 exceeds the machine speed value, then the system has detected a slip condition. In one aspect, the speed comparison may be based on a pre-set threshold of what constitutes a slip condition.

The process can further be configured to react to a rotation value of the ground engaging members 150 such an eighth of a rotation, a quarter, a sixteenth or any other desired rotation to prevent permanent tire damage. For example, the machine 100 is expected to decelerate as the bucket enters a pile of material and eventually comes to a stop. But if the ground engaging members 150 are not decelerating at the same rate, then likely the ground engaging members 150 are slipping to the point of falling into a predetermined range of severe tire damage and slip. The process may analyze trends of two lines of acceleration such as a line of acceleration of the powertrain and a line of acceleration of the machine 100. And if the lines of acceleration start to diverge then there is a likelihood of a slip condition. As another example, if the machine 100 is digging and the acceleration of the machine 100 indicates a value of zero acceleration more or less but the ground engaging members 150 start to accelerate, then there is a likelihood of a slip condition.

It may be beneficial to monitor and allow slip within a predetermined range. The magnitude of slip may be calculated and it may be determined whether the magnitude of slip exceeds a predetermined slip range. Or it is further contemplated that zero slip is desirable and therefore the controller 240 may be configured for calculating an analog 0 or 1 slip condition acceleration of the machine 100 with respect to the work surface 154 compared to the powertrain acceleration. It is contemplated that the expression of slip error may alternatively be represented as a fraction of machine speed or driven speed, a percentage, and/or any other value, if desired. Historically, wheel speed sensors at all four wheels 151 were needed to perform such checks, but in this illustrated disclosure the controller 240 receives and determines the relative values of an open powertrain (i.e. transmission) acceleration and machine acceleration that shows how fast the machine 100 is accelerating.

In other contemplated aspects, on some terrains, the penetration of the work implement 140 into the work surface 154 may cause the machine 100 to slip. Slip may be exemplified by a difference between an actual ground speed of the machine 100 and a speed of the powertrain determined by the powertrain accelerometer 234. That is, slip is determined to be occurring when the actual ground speed of the machine 100 is less than the speed of the powertrain determined by the powertrain accelerometer 234. The magnitude of slip may be influenced by characteristics of the material below the work surface 154, the cut depth or angle of the work implement 140, and a speed the machine 100.

For example, when the machine 100 is engaged in a digging environment, the rock or material may resist movement of the work implement 140 through it, thus resisting a forward movement of the machine 100. The amount of resistance applied by the material may increase with an increasing cut depth or angle of the work implement 140 or the linkage arm 146. As resistance to the work implement 140 movement increases, a torque of the machine powertrain system 130 may also increase. Eventually, the torque imparted by the machine powertrain system 130 may exceed a capacity of the work surface 154 to resist the torque, and slip may occur.

Should the controller 240 determine the powertrain acceleration does not exceed the machine acceleration, then there is no slip condition detected and block 407 executes setting Traction Control to NOT ACTIVE. The traction control process 400 loops and monitoring at block 406 continues to determine if this status changes.

Block 408 is based upon the aforementioned block 406 output of a determined slip status of the machine 100. Once block 406 has determined there is a slip condition, a value of 0 or 1 may be assigned that operates to enable Traction Control to ACTIVE as the machine 100 prepares to have torque cut to the machine powertrain system 130. Alternatively in another aspect, it is also contemplated that a slip condition may be assigned a value and then that value is compared to a slip range of values in a stored look-up table being constructed to aid in determination of whether there needs to be a torque reduction and by how much. Block 410 illustrates that the controller 240 commands a torque reduction to the ground engaging members 150 once it is determined that one or more tires 152 are slipping. Torque may be uniformly reduced across the machine powertrain system 130 using modulation methods of the machine powertrain system 130 such as through complete and/or partial disengagement of the slip clutch 212, transmission clutches, differential clutches, and/or any clutched portion of the machine powertrain system 130 as well as parallel or serial path hybrid mechanisms (electric or hydraulic).

In another aspect torque may by reduced using electrohydraulic (EH) brakes to eliminate slip. In another contemplated aspect, a parallel or serial path hybrid (electric or hydraulic) powertrain that lacks a clutch or similar device may instead reduce torque by the controller 240 communicating with hydraulic or electric-hybrid powertrain components. For example, hydraulic torque may be reduced by altering pump flow. As another example, electric torque may be reduced by changing motor current.

The magnitude and rate at which torque may be removed from the machine powertrain system 130 subsystems can be controlled as a function of the acceleration difference between the powertrain accelerometer 234 and the machine accelerometer 110. The action the process 400 deploys to reduce torque may be proportional to the rate those accelerations or decelerations deviate. It is further contemplated that the controller 240 may command a reduction in torque to the point of stopping the slip condition, not necessarily cutting all torque. This in turn allows for a fast reaction time of the process 400 while still providing productive and positive torque to the ground engaging members 150, at least as much torque as conditions allow to continue to allow the work implement 140 to work.

Alternatively it is contemplated that if the controller 240 detects that slipping is occurring, the controller 240 may command a reduction in power to the power clutch or slip clutch 212, for example such as the impeller clutch of the torque converter 210. The controller 240 may be receiving inputs from the machine accelerometer 110 and examine the rotation of the ground engaging members 150, for example the revolutions per minute (RPM), and also be receiving inputs from the powertrain accelerometer 234, and compare that value to the machine accelerometer 110 outputs.

Block 412 illustrates how the controller 240 may perform an analysis of whether the slip condition no longer exists. After torque is reduced to the machine powertrain system 130, the powertrain accelerometer 234 may be still monitoring if the slip condition event still exists. This calculation may mean that the controller 240 is receiving and evaluating data and signals in a very similar fashion as described in block 412 to compare if the machine acceleration value exceeds the powertrain acceleration value. If yes, block 414 illustrates how the controller 240 then alerts the machine 100 that the slip condition no longer exists and torque can be proportionally reintroduced to the machine powertrain system 130. For example, the majority of the occasions at which the tires 152 of a dozer machine 100 primarily fail are when the wheels are not articulated—i.e. all wheels are rotating the same speed—and engaged with a pile of material. As such, only a single speed sensor may be needed for communicating motion signals to the controller 240. For example, this output may be sent to the controller 240 by a transmission output speed sensor.

Block 414 illustrates wherein the controller 240 commands torque to be modulated back into the machine powertrain system 130 once the controller 240 alerts the machine 100 that the slip condition no longer exists. Traction control is then set to "DISABLED" (as shown in block 403) and meanwhile the traction control system will loop through again. The controller 240 may introduce torque back to nominal levels to the powertrain. Torque may be uniformly introduced across the machine powertrain system 130 using delivery and modulation methods of the machine powertrain system 130 such as through complete and/or partial engagement of components including but not limited to the following slip clutches: the impeller clutch, transmission clutch, differential clutch, and/or any clutched portion of the machine powertrain system 130 as well as parallel or serial path hybrid mechanisms (electric or hydraulic).

The machine 100 may be provided with a selector interface configured to activate a manual mode operation or an automatic mode operation of the machine 100. In effect, the operator may have the ability to fully override traction control however it may be defaulted to an ON condition.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

We claim:

1. A fraction control system configured to limit slip of a machine having a work implement, the traction control system comprising:
   a machine motion sensor configured to determine a motion of the machine;
   a work implement unit configured to determine whether the work implement of the machine is in an operational state;
   a powertrain motion sensor configured to determine a motion of a powertrain component; and
   a machine powertrain controller configured to:
      compare the motion of the machine determined by the machine motion sensor to the motion of the powertrain component determined by the powertrain motion sensor to determine slip,
      command a torque reduction to the powertrain component when slip is determined,
      enable torque reduction when it is determined by the work implement unit that the work implement of the machine is operational, and
      disable torque reduction when it is determined by the work implement unit that the work implement of the machine is not operational.

2. The traction control system of claim 1, further comprising a clutch located with the powertrain and configured to reduce torque delivered by a powertrain in response to the command from the machine powertrain controller.

3. The traction control system of claim 2, wherein the clutch is connected to one of the following: a torque converter, a transmission, a gear component, a differential, an axle, and a drive shaft.

4. The traction control system of claim 1, wherein the machine motion sensor comprises an accelerometer configured to determine an acceleration of the machine; and wherein the powertrain motion sensor comprises an accelerometer to determine the acceleration of the powertrain component.

5. The traction control system of claim 1, wherein the work implement unit determines the operational state based on at least one of the following: an operator device output commanding the work implement, an output of a position of the work implement, an output of a pressure in a hydraulic system associated with the work implement.

6. The traction control system of claim 5, wherein the position of the work implement is determined as engaged when the work implement is level with and in near contact with the ground.

7. The traction control system of claim 1, wherein the powertrain component comprises at least one of the following: a torque converter, a transmission, a gear component, a differential, an axle, a hydraulic drive component, an electric drive component, and a drive shaft.

8. A machine comprising:
   a machine frame;
   an engine held by the machine frame;
   a machine motion sensor configured to determine a motion of the machine;
   a work implement unit configured to determine whether the work implement of the machine is in an operational state;

a powertrain motion sensor configured to determine a motion of a powertrain component;

a machine powertrain controller configured to compare the motion of the machine determined by the machine motion sensor to the motion of the powertrain component determined by the powertrain motion sensor to determine slip;

the machine powertrain controller is further configured to command a torque reduction to the powertrain component when slip is determined;

the machine powertrain controller is further configured to enable the torque reduction when it is determined by the work implement unit that the work implement of the machine is operational; and the machine powertrain controller is further configured such that torque reduction is disabled when it is determined by the work implement unit that the work implement of the machine is not operational.

9. The machine of claim 8, further comprising a clutch configured to reduce torque delivered by a powertrain in response to the command from the machine powertrain controller.

10. The machine of claim 9, wherein the clutch is connected to one of the following: a torque converter, a transmission, a gear component, a differential, an axle, and a drive shaft.

11. The machine of claim 8, wherein the machine motion sensor comprises an accelerometer configured to determine an acceleration of the machine; and wherein the powertrain motion sensor comprises an accelerometer to determine the acceleration of the powertrain component.

12. The machine of claim 8, wherein the work implement unit determines the operational state based on at least one of the following: an operator device output commanding the work implement, an output of a position of the work implement, an output of a pressure in a hydraulic system associated with the work implement.

13. The machine of claim 12, wherein the position of the work implement is determined as engaged when the work implement is level with and in near contact with the work surface.

14. The machine of claim 8, wherein the powertrain component comprises at least one of the following: a torque converter, a transmission, a gear component, a differential, an axle, and a drive shaft.

15. A traction control process configured to limit slip of a machine having a work implement, the traction control process comprising:

determining a motion of the machine with a machine motion sensor;

determining whether the work implement of the machine is in an operational state with a work implement unit;

determining a motion of a powertrain component with a powertrain motion sensor;

comparing the motion of the machine determined by the machine motion sensor to the motion of the powertrain component determined by the powertrain motion sensor to determine slip with a machine powertrain controller;

reducing a torque to the powertrain component when slip is determined by the machine powertrain controller;

enabling the machine powertrain controller to reduce the torque when it is determined by the work implement unit that the work implement of the machine is operational; and disabling the machine powertrain controller from reducing the torque when it is determined by the work implement unit that the work implement of the machine is not operational.

16. The traction control process of claim 15, wherein the reducing torque further comprises reducing torque with a clutch configured to reduce torque delivered by a powertrain in response to the command from the machine powertrain controller.

17. The traction control process of claim 16, wherein the clutch is connected to one of the following: a torque converter, a transmission, a gear component, a differential, an axle, and a drive shaft; and wherein the powertrain component comprises at least one of the following: a torque converter, a transmission, a gear component, a differential, an axle, and a drive shaft.

18. The traction control process of claim 15, wherein the machine motion sensor comprises an accelerometer configured to determine an acceleration of the machine; and wherein the powertrain motion sensor comprises an accelerometer to determine the acceleration of the powertrain component.

19. The traction control process of claim 15, wherein the work implement unit determines the operational state based on at least one of the following: an operator device output commanding the work implement, an output of a position of the work implement, an output of a pressure in a hydraulic system associated with the work implement.

20. The traction control process of claim 15, wherein the position of the work implement is determined as engaged when the work implement is level with and in near contact with the work surface.

* * * * *